United States Patent
Alexander et al.

(10) Patent No.: US 10,353,928 B2
(45) Date of Patent: Jul. 16, 2019

(54) REAL-TIME CLUSTERING USING MULTIPLE REPRESENTATIVES FROM A CLUSTER

(71) Applicant: INTERNATIONAL BUSINESS MACHINES CORPORATION, Armonk, NY (US)

(72) Inventors: Tabari H. Alexander, Hyde Park, NY (US); Yuk L. Chan, Rochester, NY (US); Yuksel Gunal, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 220 days.

(21) Appl. No.: 15/364,650

(22) Filed: Nov. 30, 2016

(65) Prior Publication Data

US 2018/0150546 A1    May 31, 2018

(51) Int. Cl.
| | |
|---|---|
| G06F 16/00 | (2019.01) |
| G06F 16/28 | (2019.01) |
| G06N 20/00 | (2019.01) |
| G06F 16/22 | (2019.01) |
| G06F 16/2455 | (2019.01) |

(52) U.S. Cl.
CPC ............ *G06F 16/285* (2019.01); *G06F 16/22* (2019.01); *G06F 16/2455* (2019.01); *G06N 20/00* (2019.01)

(58) Field of Classification Search
CPC combination set(s) only.
See application file for complete search history.

(56) References Cited

U.S. PATENT DOCUMENTS

| | | | |
|---|---|---|---|
| 8,423,551 B1 | 4/2013 | Ben-Artzi et al. | |
| 8,788,405 B1* | 7/2014 | Sprague | G06F 16/335 705/38 |

(Continued)

FOREIGN PATENT DOCUMENTS

| | | |
|---|---|---|
| CA | 2490451 A1 | 6/2005 |
| CN | 102663113 A | 9/2012 |
| CN | 104462041 A | 3/2015 |

OTHER PUBLICATIONS

Michael Stonebraker, et al., "Data Curation at Scale: The Data Tamer System", Data Systems Research, Jan. 6-9, 2013, p. 1-10.

(Continued)

*Primary Examiner* — Farhan M Syed
(74) *Attorney, Agent, or Firm* — Cantor Colburn LLP; William Kinnaman

(57) ABSTRACT

Embodiments include method, systems and computer program products for real-time data clustering using multiple representatives associated with the data cluster. In some embodiments, a data point may be received from a data source. A data cluster may be identified. A set of representatives associated with the data cluster may be obtained. The data point may be compared to the set of representatives associated with the data cluster. A determination may be made to add the data point to the data cluster. The data point may be associated with the data cluster. The set of representatives associated with the data cluster may be updated, where one of the set of representatives associated with the data cluster is replaced with the data point.

14 Claims, 3 Drawing Sheets

Processing System – 100

(56) References Cited

U.S. PATENT DOCUMENTS

| | | | | |
|---|---|---|---|---|
| 8,788,407 B1* | 7/2014 | Singh | ............... | G06F 16/335 |
| | | | | 705/38 |
| 8,930,422 B2 | 1/2015 | Black | | |
| 9,037,589 B2* | 5/2015 | Anderson | ............ | G06F 16/285 |
| | | | | 707/737 |
| 9,165,299 B1* | 10/2015 | Stowe | ............... | G06F 16/335 |
| 9,171,334 B1* | 10/2015 | Visbal | ............... | G06F 16/335 |
| 9,177,344 B1* | 11/2015 | Singh | ............... | G06F 16/335 |
| 9,361,355 B2* | 6/2016 | Anderson | ............ | G06F 16/285 |
| 2013/0124525 A1* | 5/2013 | Anderson | ............ | G06F 16/285 |
| | | | | 707/737 |
| 2014/0129694 A1 | 5/2014 | Aoun et al. | | |

OTHER PUBLICATIONS

Samuel Brody, et al.,"An Unsupervised Aspect-Sentiment Model for Online Reviews" Human Language Technologies: The 2010 Annual Conference of the North American Chapter of the ACL, Jun. 2010, p. 1-9.

* cited by examiner

REAL-TIME CLUSTERING USING MULTIPLE REPRESENTATIVES FROM A CLUSTER

BACKGROUND

The present disclosure relates to data processing, and more specifically, to methods, systems and computer program products for real-time clustering using multiple representatives from a cluster.

Clustering is a type of analysis where a set of objects are grouped into clusters based on a similar trait or characteristics. Clustering may require a view on all available data. For real-time application, the data may need to be clustered as it is received. However, comparing the data to all existing data structures (e.g., clusters) to find an appropriate cluster may require too much processing time and resources to make it feasible for real-time application. In some embodiments, the first data used to form the cluster is designated as the representative of the cluster to which all future data will be compared against for clustering purposes.

SUMMARY

In accordance with an embodiment, a method for real-time data clustering using multiple representatives associated with a data cluster is provided. The method may include receiving a data point from a data source; identifying a data cluster; obtaining a set of representatives associated with the data cluster; comparing the data point to the set of representatives associated with the data cluster; determining that the data point should be added to the data cluster; associating the data point with the data cluster; and updating the set of representatives associated with the data cluster, wherein one of the set of representatives associated with the data cluster is replaced with the data point.

In another embodiment, a computer program product may comprise a storage medium readable by a processing circuit that may store instructions for execution by the processing circuit for performing a method that may include receiving a data point from a data source; identifying a data cluster; obtaining a set of representatives associated with the data cluster; comparing the data point to the set of representatives associated with the data cluster; determining that the data point should be added to the data cluster; associating the data point with the data cluster; and updating the set of representatives associated with the data cluster, wherein one of the set of representatives associated with the data cluster is replaced with the data point.

In another embodiment, a system may include a processor in communication with one or more types of memory. The processor may be configured to receive a data point from a data source; identify a data cluster; obtaining a set of representatives associated with the data cluster; compare the data point to the set of representatives associated with the data cluster; determine that the data point should be added to the data cluster; associate the data point with the data cluster; and update the set of representatives associated with the data cluster, wherein one of the set of representatives associated with the data cluster is replaced with the data point.

BRIEF DESCRIPTION OF THE DRAWINGS

The forgoing and other features, and advantages of the disclosure are apparent from the following detailed description taken in conjunction with the accompanying drawings in which.

DETAILED DESCRIPTION

In accordance with exemplary embodiments of the disclosure, methods, systems and computer program products for real-time data clustering using multiple representatives associated with a data cluster are provided. The methods and systems described herein are directed to gradually improving the mechanism for data clustering through targeted training through self-organization. In some embodiments, multiple representatives of data may be identified within a cluster. A determination may be made with regards to incoming data, whether the data is a member of the cluster by comparing the incoming data to the representatives of each cluster. In some embodiments, if the incoming data is determined to belong to a data cluster, the incoming data may replace one of the representatives associated with that cluster. To account for the natural drift that may occur by changing representatives, the data clusters may also be periodically retrained to approach a stable state.

Figure 1:
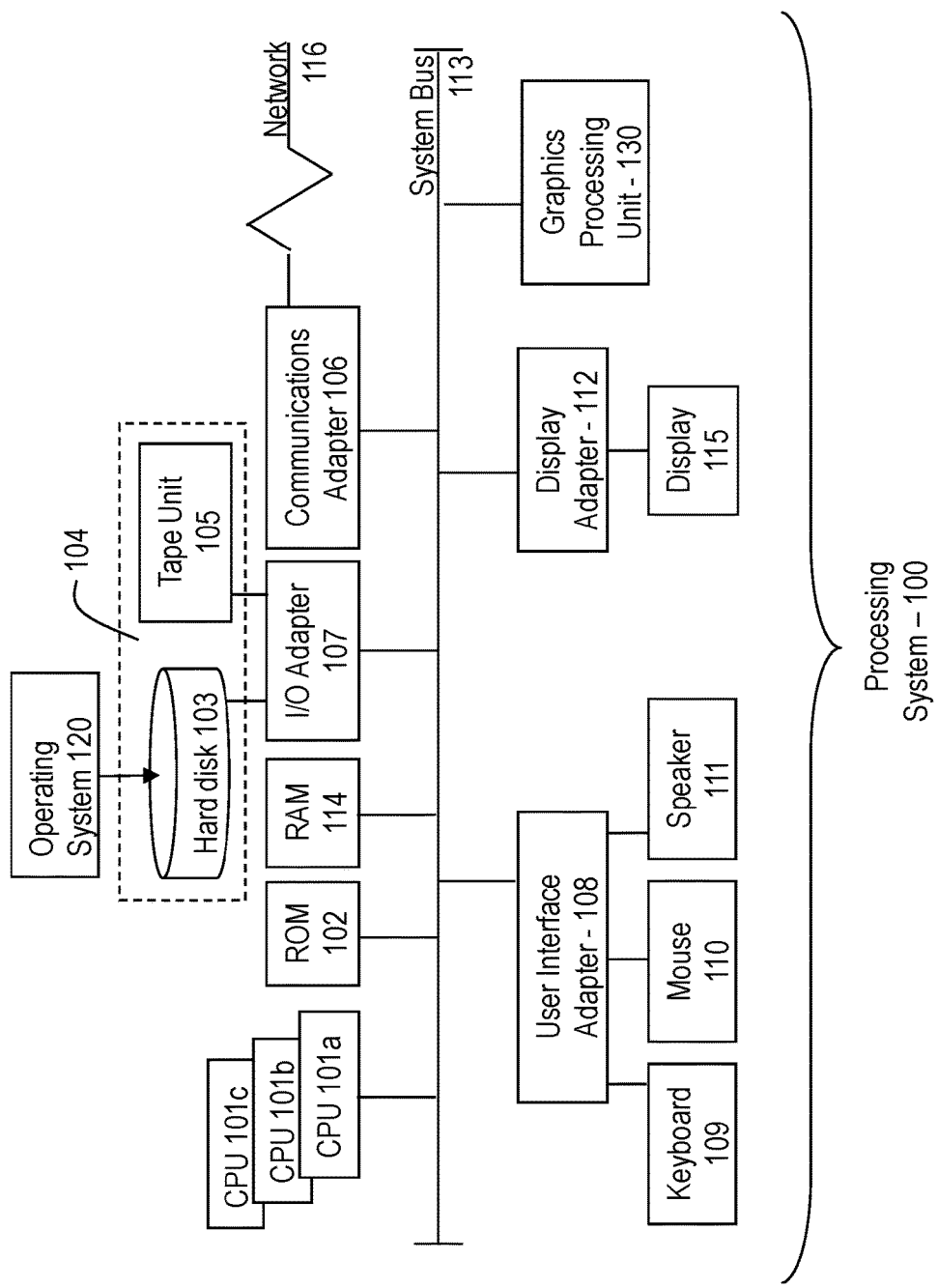
FIG. 1 is a block diagram illustrating one example of a processing system for practice of the teachings herein.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a communications adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A communications adapter 106 interconnects bus 113 with an outside network 116 enabling data processing system 100 to communicate with other such systems. A screen (e.g., a display monitor) 115 is connected to system bus 113 by display adapter 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnect to bus 113 via user interface adapter 108, which may include, for example, a Super I/O chip integrating multiple device adapters into a single integrated circuit.

In exemplary embodiments, the processing system 100 includes a graphics-processing unit 130. Graphics processing unit 130 is a specialized electronic circuit designed to manipulate and alter memory to accelerate the creation of images in a frame buffer intended for output to a display. In general, graphics-processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system such as the AIX® operating system from IBM Corporation to coordinate the functions of the various components shown in FIG. 1.

Figure 2:
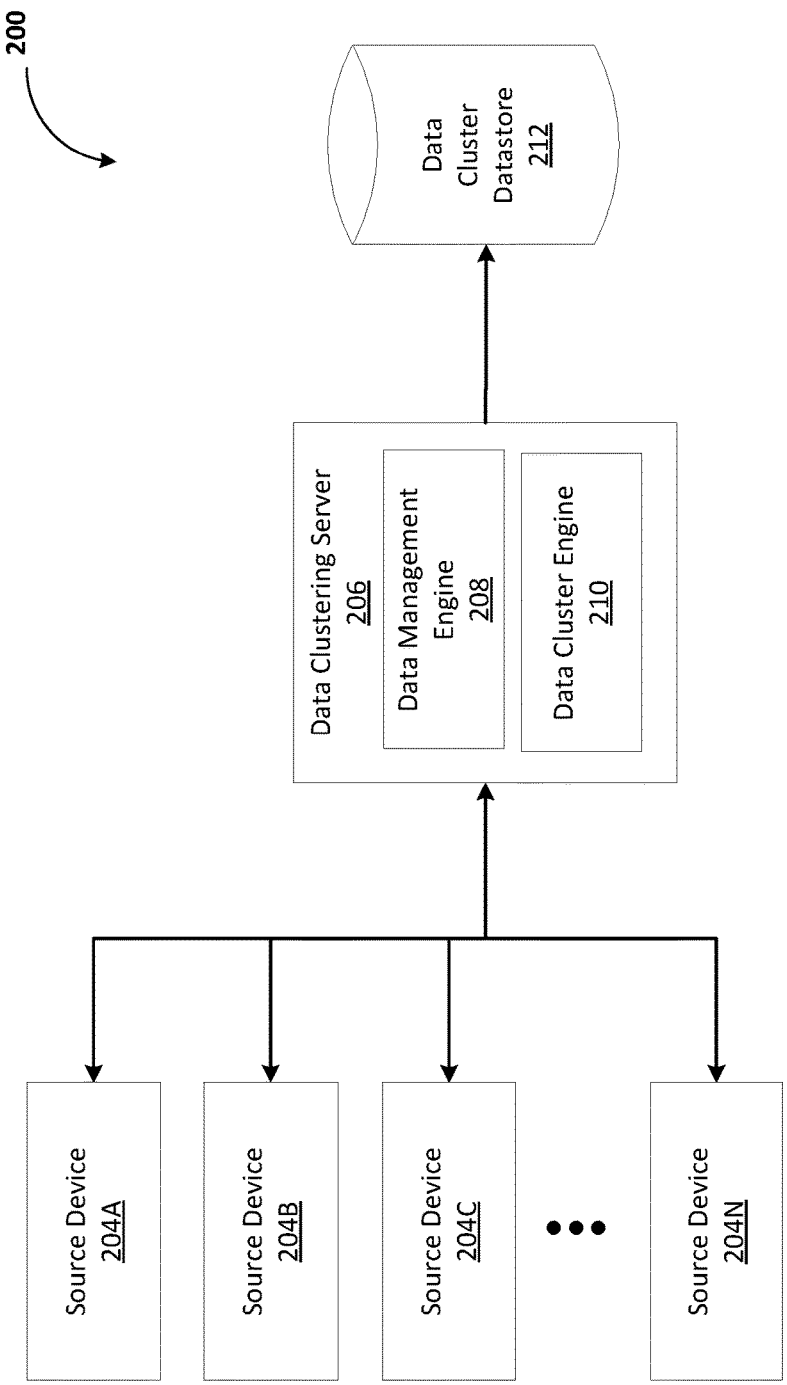
FIG. 2 is a block diagram illustrating a computing system in accordance with an exemplary embodiment.

Referring now to FIG. 2, a computing system 200 in accordance with an embodiment is illustrated. As illustrated, the computing system 200 may include, but is not limited to, multiple source devices 204A, 204B, 204C, 204N (collectively referred to as 204), a data clustering server 206, and/or a data cluster datastore 212. The data clustering server 206 may include a data management engine 208 and/or a data cluster engine 210.

In some embodiments, the source device 204 may be any type of computing device, such as a computer, laptop, tablet, smartphone, wearable computing device, server, etc. The source device 204 may provide data points that may be processed by the data clustering server 206. The source device 204 may provide data points as they are generated or obtained or in batches (e.g., based on time, number of data points, network connectivity, etc.).

In some embodiments, the data clustering server 206 may be any type of computing device with network access, such as a computer, laptop, server, tablet, smartphone, wearable computing devices, or the like. The data management engine 208 of the data clustering server 206 may include computer-readable instructions that in response to execution by the processor(s) 101, cause operations to be performed including receiving data from one or more source devices 204. The data management engine 208 may process information received from source devices 204 to identify data points that need to be organized into data clusters. The data management engine 208 may identify the data point that needs to be organized and transmit the data point to the data cluster engine 210.

The data cluster engine 210 may include computer-readable instructions that in response to execution by the processor(s) 101, cause operations to be performed including receiving the data point from the data management engine 208. The data cluster engine 210 may identify a most recently used cluster and compare the data point to the representatives associated with the cluster. The data cluster engine 210 may retrieve the representatives associated with the most recently used cluster and compare the data point to the retrieved representatives. In some embodiments, the number of representatives associated with a data cluster may be determined or set by a user or administrator of the system. In some embodiments, the number of representatives associated with a data cluster may default to a predetermined value, but may be modified by a user or administrator of the system. In some embodiments, the representatives associated with a cluster may be a data structure that is stored separately from the data cluster and stores information associated with the data points that are representative of the data cluster. Values stored in the representatives data structure may be updated by the data cluster engine 210 when a new data point is to replace an existing representative or when the data cluster engine 210 determines that the clusters need to be re-trained and a new set of data cluster representatives is identified and associated with the data cluster.

In some embodiments, the data cluster engine 210 may obtain the representatives from the data cluster datastore 212. The data cluster engine 210 may determine that the data point is to be added to a cluster. The data cluster engine 210 may use any type of selection algorithm, such as a Manhattan distance algorithm, Levenshtein distance algorithm, or the like. The data cluster engine 210 may update the representatives associated with the data cluster using the data point.

In some embodiments, the data cluster engine 210 may determine that all the clusters need to be retrained. The data cluster engine 210 may determine, for example, that all the data clusters in the data cluster datastore 212 need to be retrained. An example algorithm to retrain data clusters to identify a new set of representatives to associate with the cluster may be to use a function that identifies a set of data from the data cluster with minimal distance between the members.

Figure 3:
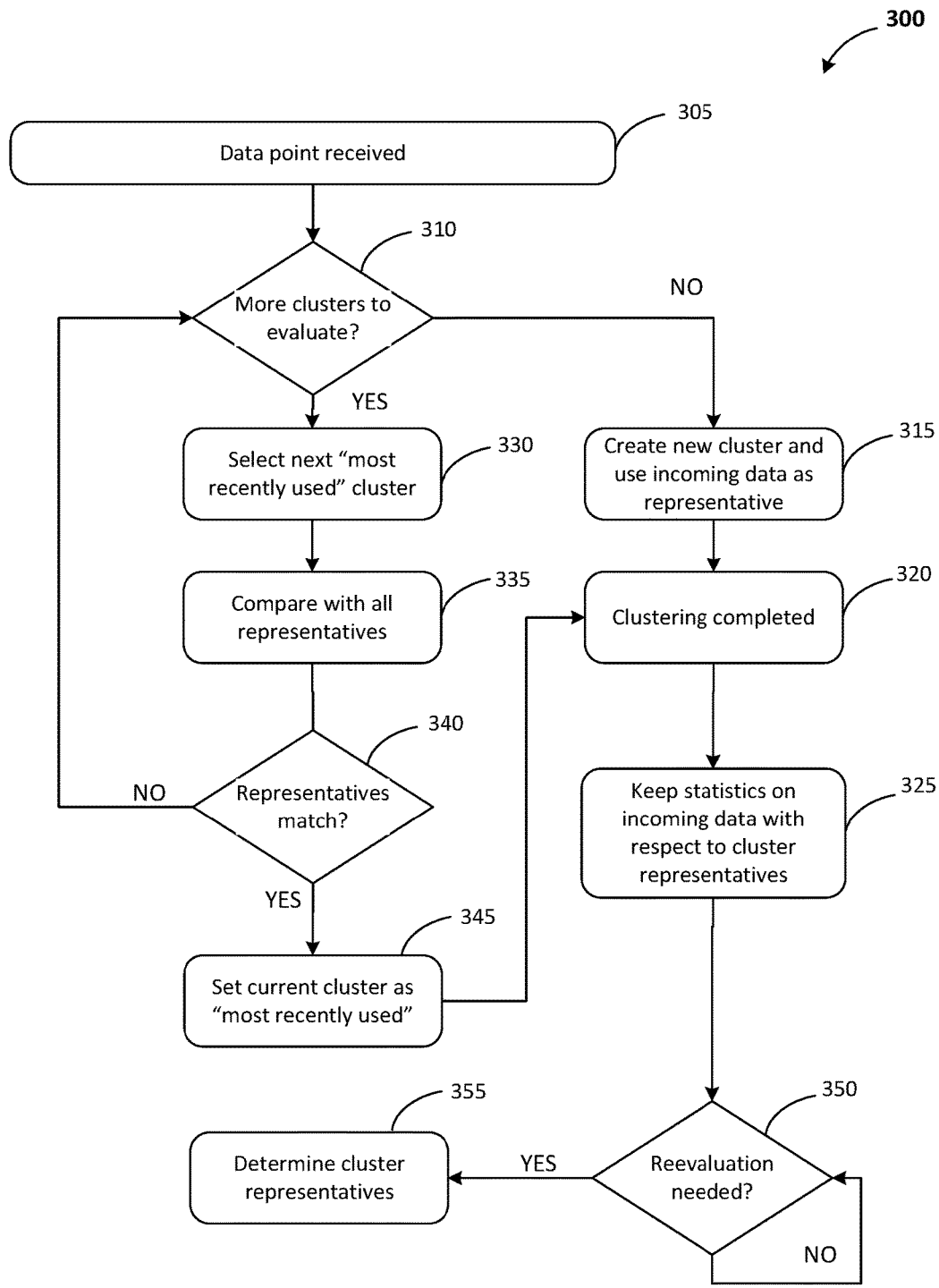
FIG. 3 is a flow diagram of a method for a real-time clustering using multiple representatives from a cluster in accordance with an exemplary embodiment.

Now referring to FIG. 3, a flow diagram of a method 300 for real-time data clustering using in accordance with an exemplary embodiment is depicted. At block 305, a data point may be received. In some embodiments, many data points may be received from a source device 204. In some embodiments, data points may be received from the source devices 204 as they are received or generated by the source device 204. In some embodiments, the source device 204 may collect data points and transmit them in batches. For example, if the source device 204 has limited network access, the source device 204 may wait to transmit the data points until a network connection can be established. In some embodiments, the source device 204 may collect data points for a set amount of time (e.g., one minute, one hour, etc.) and transmit all the data points collected during the time period.

At block 310, a determination may be made as to whether additional clusters need to be evaluated. In some embodiments, the data cluster engine 210 may check a datastore, such as the data cluster datastore 212 to determine if any more clusters need to be evaluated. If there are no further clusters to evaluate and the data point has not yet been associated with a data cluster, then at block 315, a new cluster may be generated and the data point may be used as a representative associated with the new cluster. In some embodiments, the data point may be associated with a label corresponding to the data cluster. When the data cluster engine 210 needs to obtain data from the data cluster or obtain representatives associated with the cluster, the data cluster engine 210 may utilize the label associated with the cluster to obtain the data needed.

The method may proceed to block 320, where the clustering has been completed.

At block 310, if there are additional clusters to evaluate, the method may proceed to block 330, where the next "most recently used" cluster is identified. In some embodiments, the data cluster engine 210 may track a current cluster. The data cluster engine 210 may check to determine if there is another cluster that needs to be evaluated. If yes, then the method may proceed to block 330, where the next "most recently used" cluster is identified and representatives associated with that cluster are retrieved.

At block 335, the data point is compared with the representatives associated with the data cluster being evaluated. The data cluster engine 210 may compare the data point to the current cluster representatives to determine whether the data point should be added to the cluster. The data cluster engine 210 may use a selection function, such as a Manhattan distance algorithm, Levenshtein distance algorithm, or the like to determine whether the data point should be added to the cluster.

In some embodiment, the representatives within a cluster could have different criteria, or different algorithm. For example, when using Levenshtein distance algorithm, the input data point might require at least a distance of five from representative A, and at least a distance of three from representative B. The distance could be a function depending on the data point or the representative. For example, it could be calculated dynamically using number of tokens in representative A divided by 2.

In some embodiment, the comparison to each representative could use multiple algorithms. For example, a twitter post compare with a representative using both the category (e.g., such as product review, politics, etc.) and sentiment.

In some embodiment, the number of representative that the data point must satisfy can be dynamically determined. For example, the determination of a data point belongs to a cluster can require the data point to satisfy at least 75% of the representatives. In another example, the determination of a data point belongs to a cluster can require the data point to satisfy at least two representatives.

At block 340, the data cluster engine 210 may determine whether the data point matches or otherwise determine that the data point should be added to the cluster. If the data cluster engine 210 determines that the data point should not be added to the cluster, the method may proceed back to block 310. If the data cluster engine 210 determines that the data point should be added to the cluster, the method may proceed to block 345. At block 345, the data cluster engine 210 may set the current cluster as the "most recently used." In some embodiments, the data cluster engine 210 may store an indication that the current cluster is the most recently used data cluster. In some embodiments, the indication may be stored in the data cluster datastore 212 or may be transmitted to the data management engine 208. The method may then proceed to block 320, where the clustering has been completed.

From block 320, the method may proceed to block 325, where statistics associated with the incoming data are stored in association with the cluster representatives. Examples of such statistics may include source device information, date received, time received, type of data, and the like. At block 350, the data cluster engine 210 may determine whether a reevaluation of the clusters is needed. In some embodiments, the data cluster engine 210 may determine that a reevaluation is needed based on a threshold, such as a time threshold (e.g., every month) or based upon a triggering event (e.g., generation of three new clusters in a row). In some embodiments, the data cluster engine 210 may determine that clusters need to be reevaluated using a function (e.g., determine the distance between all data within a cluster, and reevaluated if the largest distance and smallest distance is greater than 4).

If the data cluster engine 210 determines that a reevaluation is needed, then the method may proceed to block 355, where the data cluster engine 210 may use the statistics from block 325 to determine or identify new cluster representatives, new criteria, or algorithms for all data clusters or a subset of data clusters.

For example, at block 355, when the data cluster engine 210 evaluates representatives for cluster A, it may use all data from the cluster A, representatives from all or a subset of existing clusters, or all data from all or a subset of existing clusters. The use of other clusters data allows the data cluster engine 210 to evaluate cluster A to determine the gap, which includes data already covered and not already covered by other clusters. Based on this, representatives, criteria and algorithms may be selected for cluster A.

In some embodiment, the number of representatives may be different between clusters, or may change over time for the same cluster. For example, depending on the data in cluster A and cluster B, three representatives might be identified for cluster A and five representatives might be identified for cluster B. At a different time, cluster B might be re-evaluated and represented by four representatives.

In some embodiment, the representative may be virtual and created based on existing data points. For example, the Levenshtein Distance Algorithm may be applied to cluster X with two data points ("A A A B" and "A A A C"). In this example, "A A A B" is selected as the representative with a criteria distance of 1. When considering a new data point "A A A D", it requires one change to become "A A A B", which satisfies the requirement of a distance of 1 and, therefore, belongs to cluster X. During reevaluation, it may be determined that another cluster, cluster Y, contains a data point "A A B B". A future incoming data point Z may include the values "A A B B." Data point Z may be mapped to cluster X if cluster X is evaluated before cluster Y. This will cause data point Z to be allocated to cluster X even though it would be more appropriate to be associated with cluster Y. Therefore, a new representative "A A B *" may be created for cluster X to avoid associating a data point that should be mapped to cluster Y, where the "*" is used as wildcard match in this example. This new representative will be matched using a different algorithm, such that data point matching representative "A A B *" will not be assigned to cluster Y.

If the data cluster engine 210 determines at block 350 that a reevaluation is not needed, then the method may proceed back to block 350.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for real-time data clustering using multiple representatives associated with a data cluster, the method comprising:
    receiving, by a first computing system comprising a memory and a processor, a first data point from a second computing system, wherein the second computing system is configured to transmit the first data point to the first computing system over a communication network;
    identifying, by the first computing system, a data cluster;
    obtaining, by the first computing system, a set of representatives associated with the data cluster;
    comparing, by the first computing system, the first data point to the set of representatives associated with the data cluster;
    determining, by the first computing system, that the first data point should be added to the data cluster by at least executing, by the first computing system, a Manhattan distance algorithm or a Levenshtein distance algorithm;
    associating, by the first computing system the first data point with the data cluster; and
    updating the set of representatives associated with the data cluster, wherein one of the set of representatives associated with the data cluster is replaced with the first data point;
    storing, by the first computing system in the memory of the first computing system, an indication that the data cluster is a most recently used data cluster;

receiving, by the first computing system, a second data point from the second computing system, wherein the second computing system is configured to transmit the second data point to the first computing system over the communication network;

comparing, by the first computing system, the second data point with the most recently used data cluster;

determining, by the first computing system, that the second data point does not belong to the most recently used data cluster;

identifying, by the first computing system, a next data cluster, wherein the next data cluster is identified as a next most recently used data cluster;

determining, by the first computing system, that the second data point belongs to the next data cluster based on a set of representatives associated with the next data cluster;

associating, by the first computing system, the second data point with the next data cluster; and updating, by the first computing system, the set of representatives associated with the next data cluster, wherein one of the set of representatives associated with the next data cluster is replaced with the second data point.

2. The computer-implemented method of claim 1, further comprising:

receiving a third data point from the second computing system, wherein the second computing system is configured to transmit the third data point to the first computing system over the communication network;

determining to generate a new data cluster in response to comparing the third data point to existing data clusters and determining that the third data point does not match an existing data cluster; and generating the new data cluster using the third data point as a representative associated with the new data cluster.

3. The computer-implemented method of claim 1, further comprising:

determining to reevaluate the data cluster; and identifying a new set of representatives associated with the data cluster.

4. The computer-implemented method of claim 1, further comprising:

updating the indication stored in the memory of the first computing system to indicate that the next data cluster is the most recently used data cluster.

5. The computer-implemented method of claim 1, wherein associating the data point with the data cluster further comprises:

associating the first data point with a label corresponding to the data cluster, wherein the label includes the indication.

6. A computer program product comprising a storage medium readable by a processing circuit and storing instructions for execution by the processing circuit for performing a method comprising:

receiving, by a first computing system comprising a memory and a processor, a first data point from a second computing system, wherein the second computing system is configured to transmit the first data point to the first computing system over a communication network;

identifying, by the first computing system, a data cluster;

obtaining, by the first computing system, a set of representatives associated with the data cluster;

comparing, by the first computing system, the first data point to the set of representatives associated with the data cluster;

determining, by the first computing system, that the first data point should be added to the data cluster by at least executing, by the first computing system, a Manhattan distance algorithm or a Levenshtein distance algorithm;

associating, by the first computing system the first data point with the data cluster;

updating the set of representatives associated with the data cluster, wherein one of the set of representatives associated with the data cluster is replaced with the first data point;

storing, by the first computing system in the memory of the first computing system, an indication that the data cluster is a most recently used data cluster;

receiving, by the first computing system, a second data point from the second computing system, wherein the second computing system is configured to transmit the second data point to the first computing system over the communication network;

comparing, by the first computing system, the second data point with the most recently used data cluster;

determining, by the first computing system, that the second data point does not belong to the most recently used data cluster;

identifying, by the first computing system, a next data cluster, wherein the next data cluster is identified as a next most recently used data cluster;

determining, by the first computing system, that the second data point belongs to the next data cluster based on a set of representatives associated with the next data cluster;

associating, by the first computing system, the second data point with the next data cluster; and updating, by the first computing system, the set of representatives associated with the next data cluster, wherein one of the set of representatives associated with the next data cluster is replaced with the second data point.

7. The computer program product of claim 6, the method further comprises:

receiving a third data point from the second computing system, wherein the second computing system is configured to transmit the third data point to the first computing system over the communication network;

determining to generate a new data cluster in response to comparing the third data point to existing data clusters and determining that the third data point does not match an existing data cluster; and generating the new data cluster using the third data point as a representative associated with the new data cluster.

8. The computer program product of claim 6, the method further comprises:

determining to reevaluate the data cluster; and identifying a new set of representatives associated with the data cluster.

9. The computer program product of claim 6, the method further comprises:

updating the indication stored in the memory of the first computing system to indicate that the next data cluster is the most recently used data cluster.

10. The computer program product of claim 6, wherein associating the data point with the data cluster further comprises:

associating the first data point with a label corresponding to the data cluster, wherein the label includes the indication.

11. A system, comprising:
a processor in communication with one or more types of memory, the processor configured to:
receive a first data point from a second computing system, wherein the second computing system is configured to transmit the first data point to the processor over a communication network;
identify a data cluster;
obtain a set of representatives associated with the data cluster;
compare the first data point to the set of representatives associated with the data cluster;
determine that the first data point should be added to the data cluster by at least executing, by the processor, a Manhattan distance algorithm or a Levenshtein distance algorithm;
associate the first data point with the data cluster;
update the set of representatives associated with the data cluster, wherein one of the set of representatives associated with the data cluster is replaced with the first data point;
store in a memory, of the one or more types of memory, an indication that the data cluster is a most recently used data cluster;
receive a second data point from the second computing system, wherein the second computing system is configured to transmit the second data point to the processor over the communication network;
compare the second data point with the most recently used data cluster;
determine that the second data point does not belong to the most recently used data cluster;
identify a next data cluster, wherein the next data cluster is identified as a next most recently used data cluster;
determine that the second data point belongs to the next data cluster based on a set of representatives associated with the next data cluster;
associate the second data point with the next data cluster; and
update the set of representatives associated with the next data cluster, wherein one of the set of representatives associated with the next data cluster is replaced with the second data point.

12. The system of claim 11, wherein the processor is further configured to:
receive a third data point from the second computing system, wherein the second computing system is configured to transmit the third data point to the processor over the communication network;
determine to generate a new data cluster in response to comparing the third data point to existing data clusters and determining that the third data point does not match an existing data cluster; and
generate the new data cluster using the third data point as a representative associated with the new data cluster.

13. The system of claim 11, wherein the processor is further configured to:
determine to reevaluate the data cluster; and
identify a new set of representatives associated with the data cluster.

14. The system of claim 11, wherein the processor is further configured to:
update that indication stored in the memory to indicate that the next data cluster is the most recently used data cluster.

* * * * *